US006260251B1

(12) United States Patent
Guhl

(10) Patent No.: US 6,260,251 B1
(45) Date of Patent: Jul. 17, 2001

(54) UNITARY PROFILE FOR WINDOW CONSTRUCTION

(75) Inventor: James Curtis Guhl, Hudson, WI (US)

(73) Assignee: Andersen Corporation, Bayport, MN (US)

( * ) Notice: Subject to any disclaimer, the term of this patent is extended or adjusted under 35 U.S.C. 154(b) by 0 days.

(21) Appl. No.: 09/386,785

(22) Filed: Aug. 31, 1999

(51) Int. Cl.[7] .................................................... B23P 17/00

(52) U.S. Cl. .................................. 29/416; 29/412; 52/98; 52/745.15; 52/204.62; 52/730.4; 49/341

(58) Field of Search ............................ 29/416, 412, 413; 52/98, 100, 745.15, 204.62, 730.4, 734.1; 49/339, 340, 341

(56) References Cited

U.S. PATENT DOCUMENTS

| | | | | |
|---|---|---|---|---|
| 3,822,462 | * | 7/1974 | Chubb | 29/416 |
| 3,885,371 | * | 5/1975 | Oakes | 52/475 |
| 4,103,411 | | 8/1978 | Gottsegen . | |
| 4,259,813 | | 4/1981 | Winner et al. . | |
| 4,471,597 | | 9/1984 | Walton . | |
| 4,481,701 | | 11/1984 | Hewitt . | |
| 4,945,679 | * | 8/1990 | Aumercier | 49/432 |
| 5,069,849 | | 12/1991 | Wain . | |
| 5,204,035 | | 4/1993 | Boltze et al. . | |
| 5,379,518 | | 1/1995 | Hopper . | |
| 5,406,768 | | 4/1995 | Giuseppe et al. . | |
| 5,538,777 | | 7/1996 | Pauley et al. . | |
| 5,570,548 | | 11/1996 | Hopper . | |
| 6,076,314 | * | 6/2000 | Simonton et al. | 52/204.1 |

* cited by examiner

*Primary Examiner*—S. Thomas Hughes
*Assistant Examiner*—John C. Hong
(74) *Attorney, Agent, or Firm*—Merchant & Gould P.C.

(57) ABSTRACT

A method for assembling a window is described including forming a lineal member having a cross-sectional profile, where the profile includes a sash portion and a frame portion, cutting the lineal member into lengths sized for forming the window, and joining the lengths of the lineal member to form a shape of the window. The sash portions form a sash and the frame portions form a frame. Then the sash is separated from the frame.

34 Claims, 10 Drawing Sheets

UNITARY PROFILE FOR WINDOW CONSTRUCTION

FIELD OF THE INVENTION

The present invention is directed to a method for constructing a window and more particularly to a efficient method for constructing a window by combining the manufacture and/or assembly of certain window components.

BACKGROUND OF THE INVENTION

A typical window includes at least a frame and a sash. The frame is mounted into a wall or other structural component, and forms the outer perimeter of the window. The sash fits within the frame, and holds the glazing, such as glass. The frame and sash are frequently each composed of four separate linear members that are joined at the corners to form a rectangle. Often the linear members are initially hollow. For venting windows, at least a portion of the sash is movable with respect to the frame. For non-venting or stationary windows, the sash will not be movable.

During manufacturing, a single length of a sash profile, for example, may be manufactured at once, and then cut into the individual linear sash members to form the sash. Extrusion methods may be used to form the single lengths. Then the individual linear sash members are joined to form the rectangular shape of the sash. A similar process may be used to form the frame.

If two separate components, such as a frame and a sash, are used in a window, then two separate lengths of profile must be produced and two separate cutting and assembly processes must be undertaken to make the individual components of the window. For a typical window including a sash and a frame with a perimeter of about 14 feet, the conventional approach requires about 28 feet of various linear components in order to form one window. In addition, each sash linear component and each frame linear component require several additional assembly steps in order to form a window. For example, mitered corners must be formed on each linear component of the sash and the frame. Also, the sash lineal components and the frame lineal components are separately assembled into the sash and the frame, respectively. Because the sash and the frame are assembled separately, it is possible for some discrepancies to exist between the shape of the sash and the shape of the frame so that the two components may not fit perfectly together. A substantial need exists for a less expensive, more efficient, and higher quality method of producing a window, especially using linear members.

SUMMARY OF THE INVENTION

Generally, the present invention provides efficiencies and quality improvements in methods for manufacturing windows by combining the formation of certain components, such as a sash and a frame, and by combining assembly steps. In one particular embodiment of the invention, a method for assembling a window includes the steps of forming a lineal member having a cross-sectional profile, where the profile includes a sash portion and a frame portion. The method includes separating the lineal member into a plurality of lengths, joining the lengths to form a shape of the window, where the sash portions form a sash and the frame portions form a frame, and separating the sash from the frame.

In one embodiment of the invention, the method may include the step of installing hardware onto the frame and sash, such as a lock, an operator, and/or a hinge. In a preferred embodiment, the sash portion includes an extension portion that at least partially conceals a platform of the frame where the actuator is attached to the frame when the sash and frame are in a closed position.

In another particular embodiment of the invention, a cover portion may be included in the profile of the lineal member. The cover may be capable of enclosing hardware that is installed on the frame. In another particular embodiment, the cover portion includes a hinge portion and the method may include the steps of bending the cover portion at the hinge portion, installing hardware on the frame portion and securing the cover portion to the frame portion.

The present invention also includes a method for manufacturing windows whereby a single production operation is used to form both venting windows and non-venting windows until a final step of separating a sash from a frame for venting windows. First, a lineal member is formed having a cross-sectional profile, the profile including a sash portion and a frame portion. The method further includes cutting the lineal member into lengths sized for forming a window, joining at least four of the lengths of the lineal member to form a shape of a window, where the sash portions form a sash and the frame portions form a frame. The method further includes separating the sash from the frame where a venting window is desired and allowing the sash and frame to remain connected for a non-venting window.

BRIEF DESCRIPTION OF THE DRAWINGS

The invention may be more completely understood by considering the detailed description of various embodiments of the invention which follows in connection with the accompanying drawings.

Figure 1:
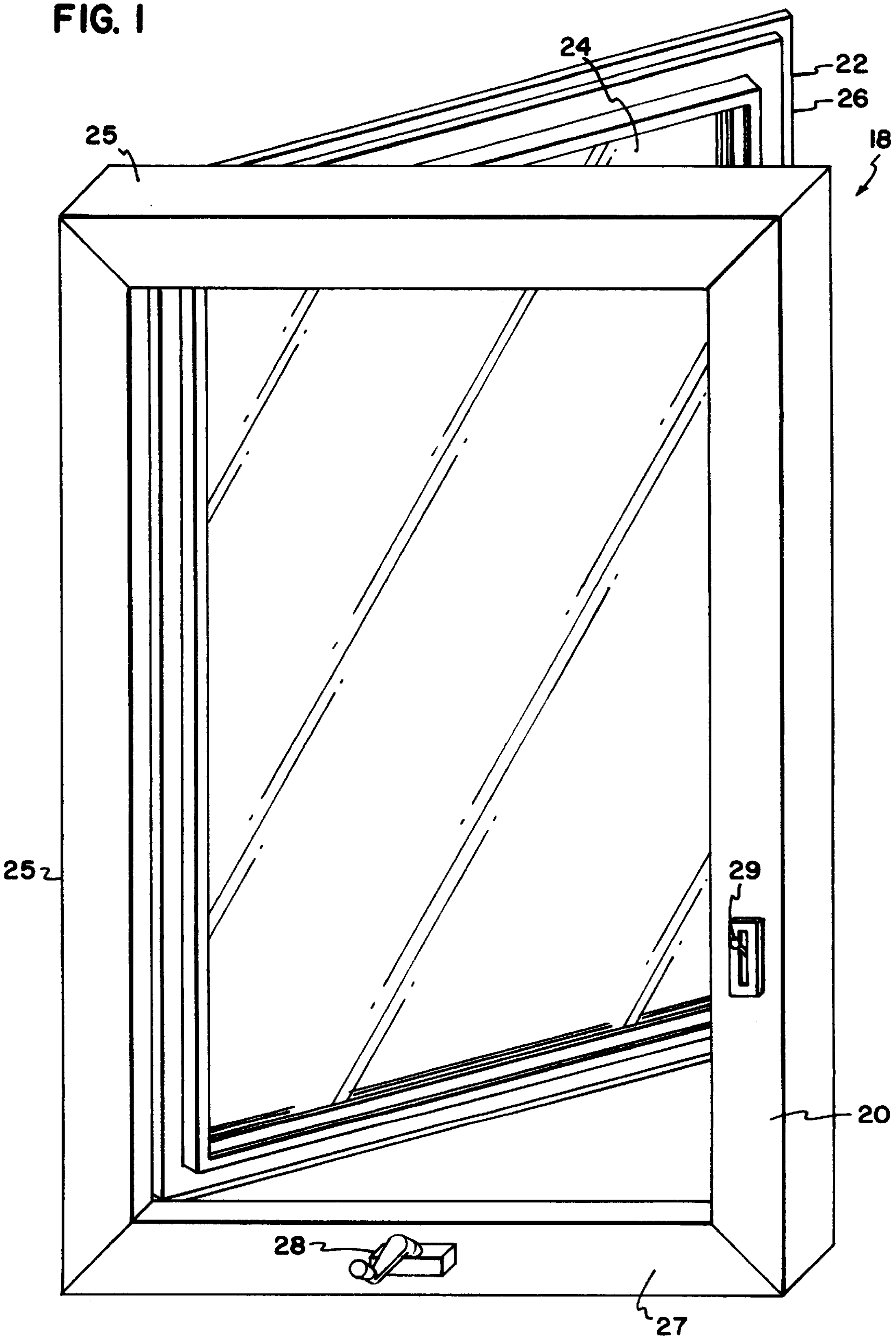
FIG. 1 is a perspective view of one embodiment of a window of the present invention, specifically a casement window, in an open position.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of methods and systems for constructing windows and other structural components. The invention has been found to be particularly advantageous in application environments where production of more than one linear component can be combined. While the present invention is not so limited, an appreciation of various aspects of the invention is best gained through a discussion of various application examples operating in such an environment.

FIG. 1 is an example of a window 18 that can be produced using the method of the present invention. An out-swinging casement window 18 is illustrated, including a frame 20, a sash 22, and glazing 24. The frame 20 is made of four individual frame members 25, while the sash 22 is made of four individual sash members 26. The window 18 may include some hardware components, such as an operator 28, for opening and closing the window, and a latch 29.

Although many other shapes are possible, and can be constructed using the method of the present invention, rectangles are the most common shape for windows and only rectangles will be discussed in connection with the Figures. However, the invention can be applied to windows of many shapes other than rectangles.

The present invention is particularly useful for forming hinged venting windows in combination with non-venting or stationary windows, as will be discussed further below. In the drawings, only out-swinging casement windows are illustrated, however, the manufacturing steps of the present invention are applicable to many different types of windows or doors, such as in-swinging casement windows. For example, the present invention would be very useful for manufacturing all types of hinged windows and doors, including casement windows, basement windows, and awning windows. The present invention could be utilized for these and other types of doors and windows that swing either toward the indoors or toward the outdoors. In addition, the manufacturing steps of the present invention are also applicable to non-hinging windows or doors, such as sliding windows or doors or double hung windows.

According to the invention, two or more components of the window can be formed in the same manufacturing process and later be separated. A lineal member is formed that includes a frame portion and a sash portion. A lineal member is a linear component of a window that generally has a uniform cross-section along its length. In one embodiment, the linear member is then cut into lengths sized for forming a window. The lengths are joined to form the shape of a window, where the sash portions form a sash and the frame portions form a frame. Then the sash may be separated from the frame to form a venting window. Other window components, such as a cover or cladding or trim attachment portions may also be included in the profile of the lineal member, and will be discussed in more detail below.

One advantage of the present invention is production efficiency because the lineal member is formed in one process but includes both the sash portions and the frame portions. Efficiencies are also achieved during assembly. For example, mitered corners can be cut on both the sash members and frame members simultaneously when they are both part of the lineal member. Also, the step of joining the mitered corners of the lineal members together provide the sash and frame comer connections in one step. Another advantage of the present invention is that venting and non-venting windows may be constructed using many of the same production steps, up until the time when the sash and frame are separated. As a result, the manufacturing equipment needed to make both window styles is reduced. For example, casement windows and stationary windows are often made in the same assembly plant because these two types of windows are desirable for combinations in one location in a home. According to the present invention, casement windows and stationary windows may be manufactured using a single production assembly line up until the step of separating the sash from the frame for the venting windows.

Another advantage of the present invention is the increased likelihood of establishing a perfect fit between a sash and a frame formed using the present invention. Because the sash and frame are still connected in the lineal profile when the lineal members are joined at the corners to form a window, the sash and frame will have an identical shape, even if this shape is a slightly imperfect rectangle.

Figure 5:
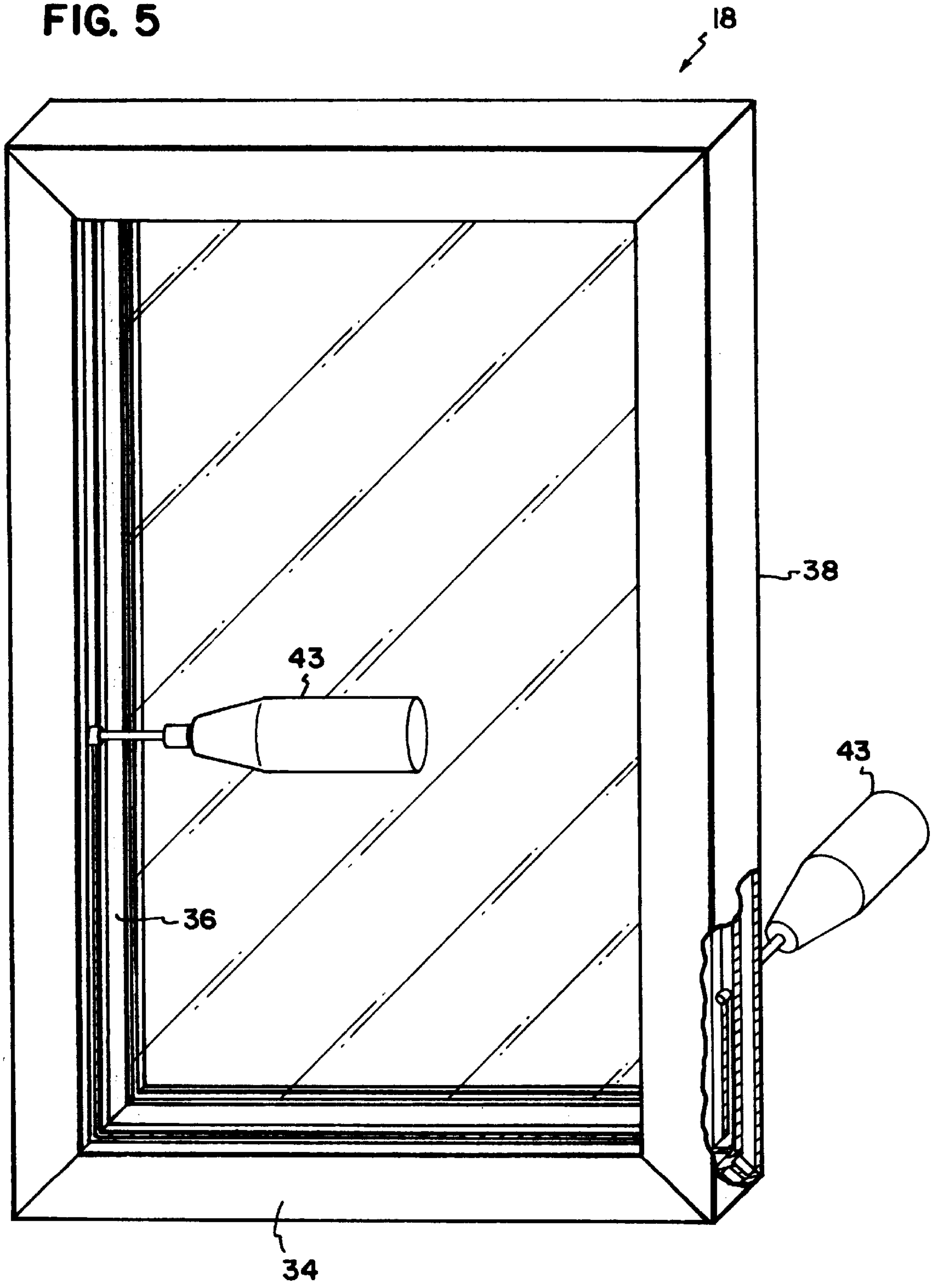
FIG. 5 is a perspective view of one embodiment of a combined sash and frame of the present invention, with a panel of glazing installed, showing routers being used to separate the sash and frame.
Figure 6:
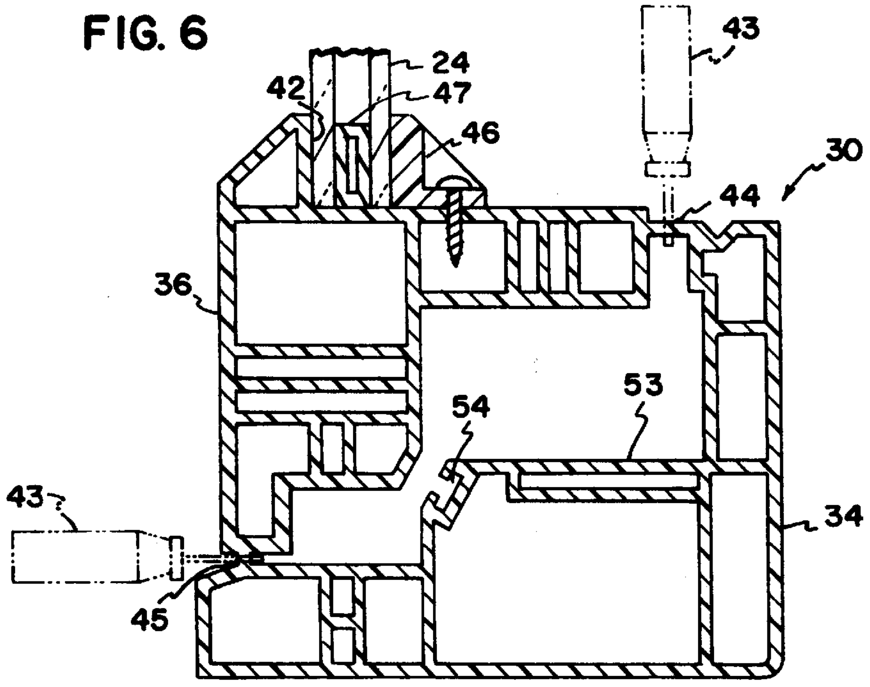
FIG. 6 is a cross-sectional view of a lineal member of a first embodiment of the present invention.

In one preferred embodiment of the invention, a lineal member 30 shown in cross-section in FIG. 6, is formed including both a frame portion 34 and a sash portion 36. The process of manufacturing a window according to the present invention will now be discussed with reference to FIGS. 2–5 which show manufacturing assembly steps.

Figure 7:
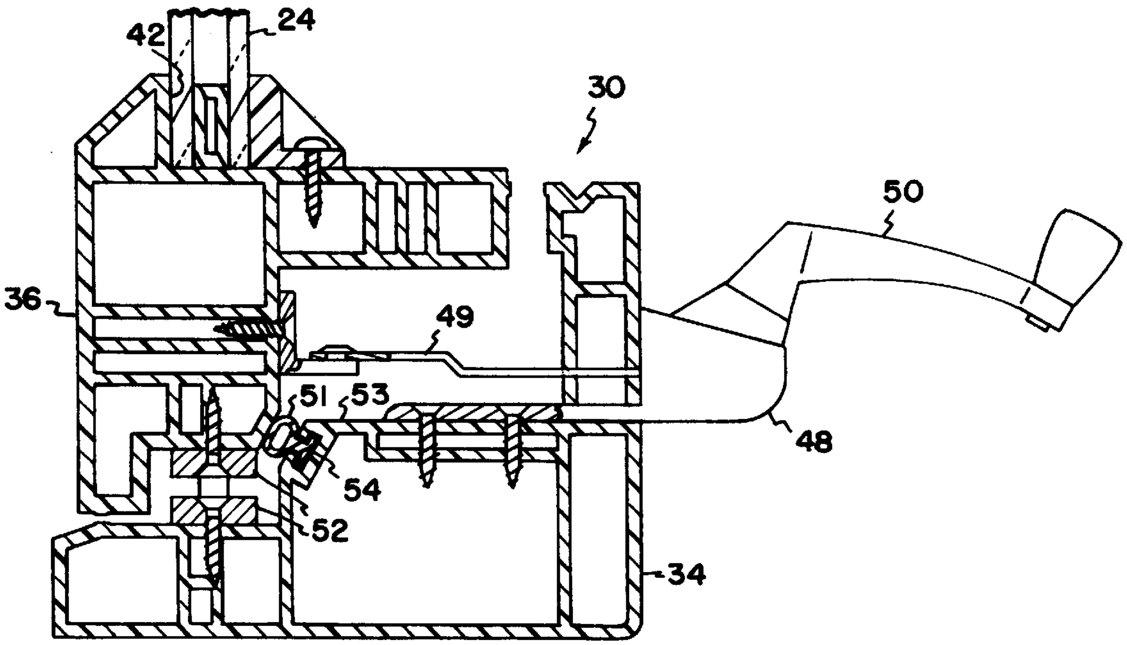
FIG. 7 is a cross-sectional view of the lineal member of FIG. 6, shown after the sash and frame have been separated and hardware has been installed.

The profile of the lineal member 30 that is illustrated in FIGS. 6 and 7 will be discussed in relation to the assembly method of FIGS. 2–5. However, it should be understood that other profile configurations are possible and are contemplated for use with the manufacturing steps of the present invention. Other examples of profile configurations will be specifically discussed with reference to FIGS. 8–12. The profiles of FIGS. 8–12 may be incorporated into a window manufacturing process using many of the same manufacturing steps as are illustrated and will be discussed with reference to FIGS. 2–5.

Figure 2:
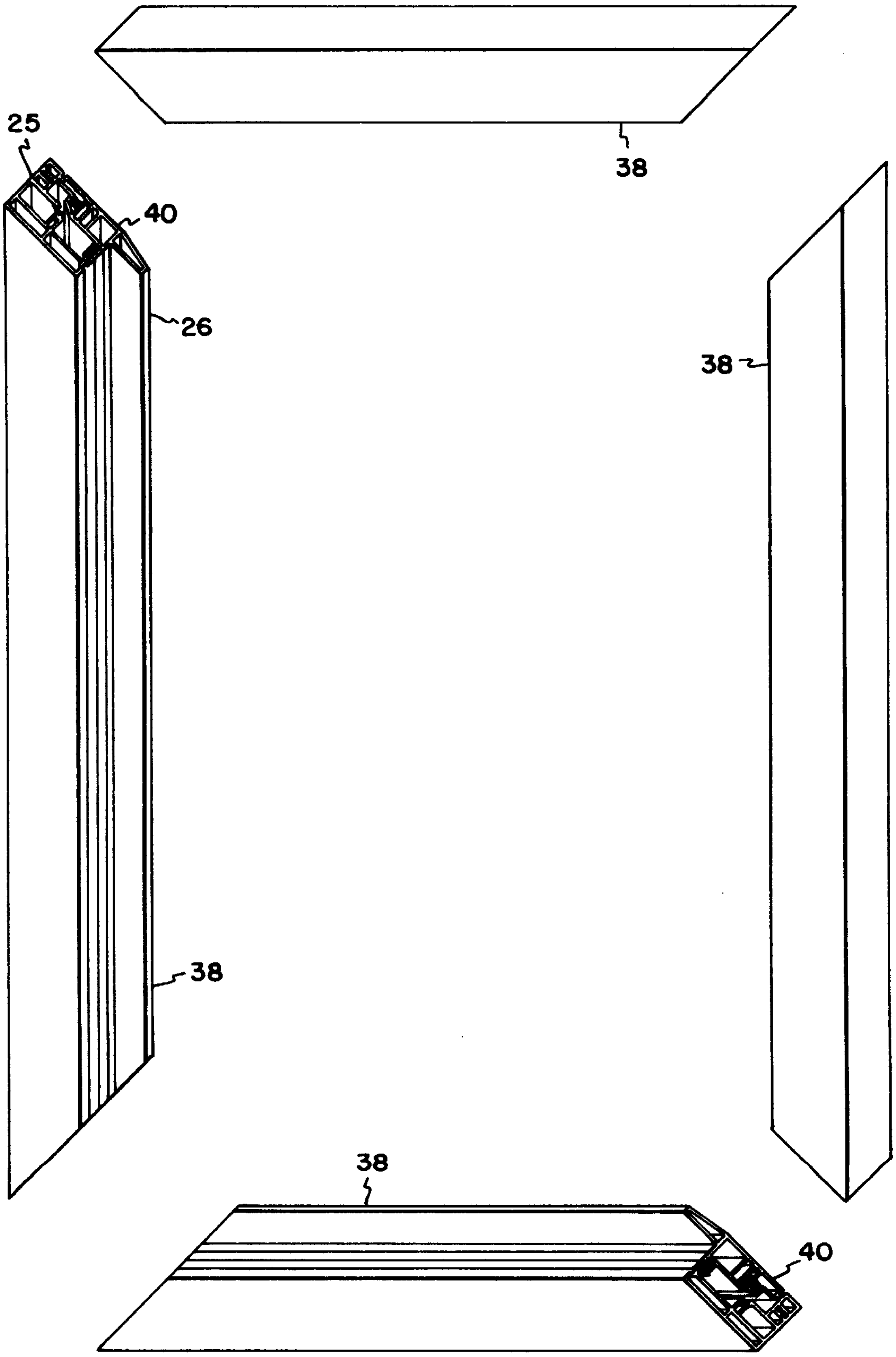
FIG. 2 is a perspective view of four lengths of a lineal member that are included in one embodiment of the window of the present invention.

First, a lineal member 30 is formed having a uniform cross-section (as shown in FIG. 6) along its length. The lineal member 30 includes a frame portion 34 and a sash portion 36. After formation, the lineal member 30 is then cut into smaller, individual lengths 38 for making a window, as shown in FIG. 2. Each length 38 includes a frame member 25 and a sash member 26 that are joined together. The individual lengths 38 are provided with appropriate comer angles 40 for joining into the desired window shape. For example, the lengths 38 can be provided with mitered corners for forming a rectangle.

Figure 3:
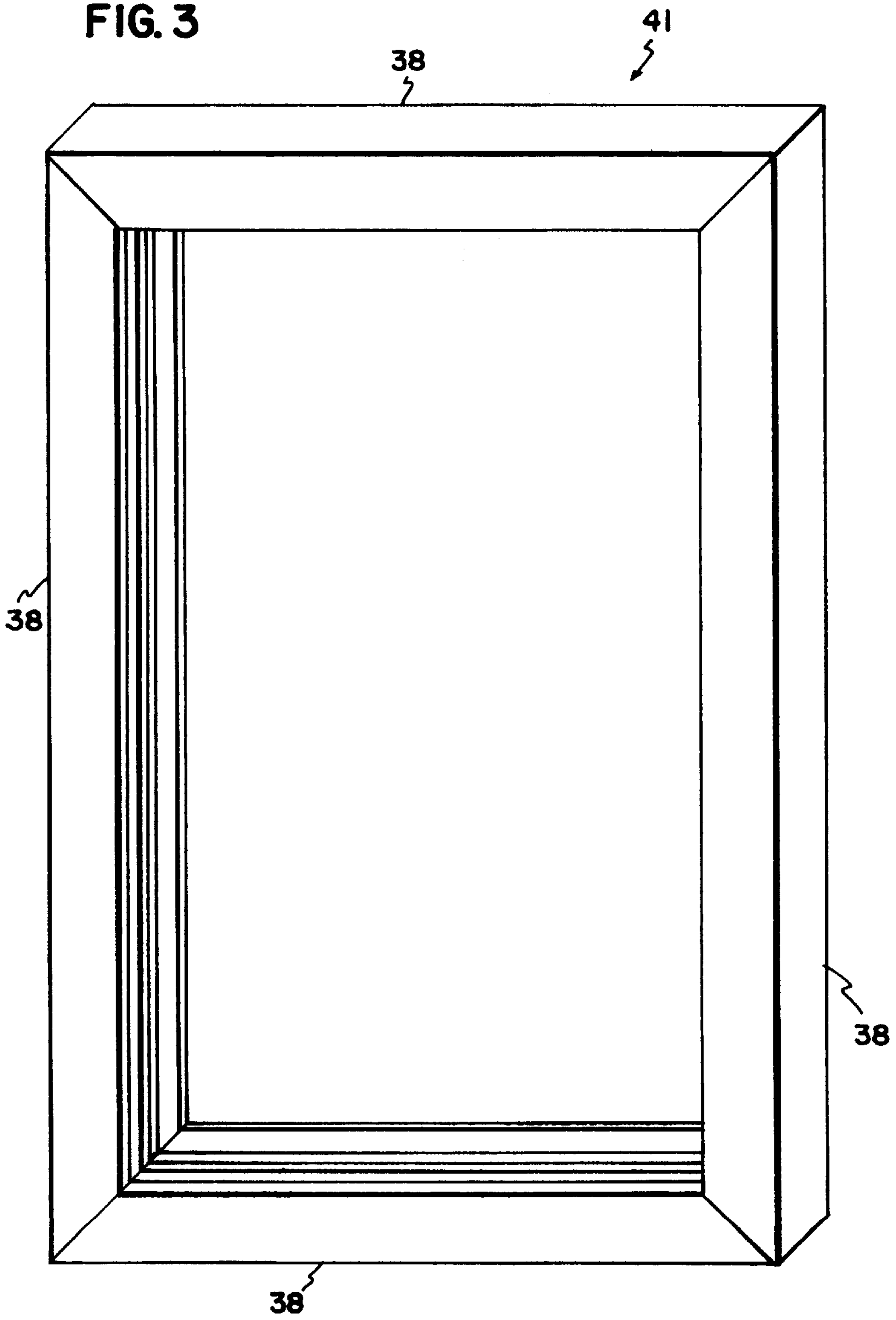
FIG. 3 is a perspective view of four lineal members assembled to form a window shape, including a combined sash and frame, of one embodiment of the present invention.

Then, ends of the individual lengths 38 are joined together to form a window shape outline 41, as shown in FIG. 3.

Adhesive, corner keys, welding or other joining techniques known in the art are used to join the unitary members into the window shape.

Figure 4:
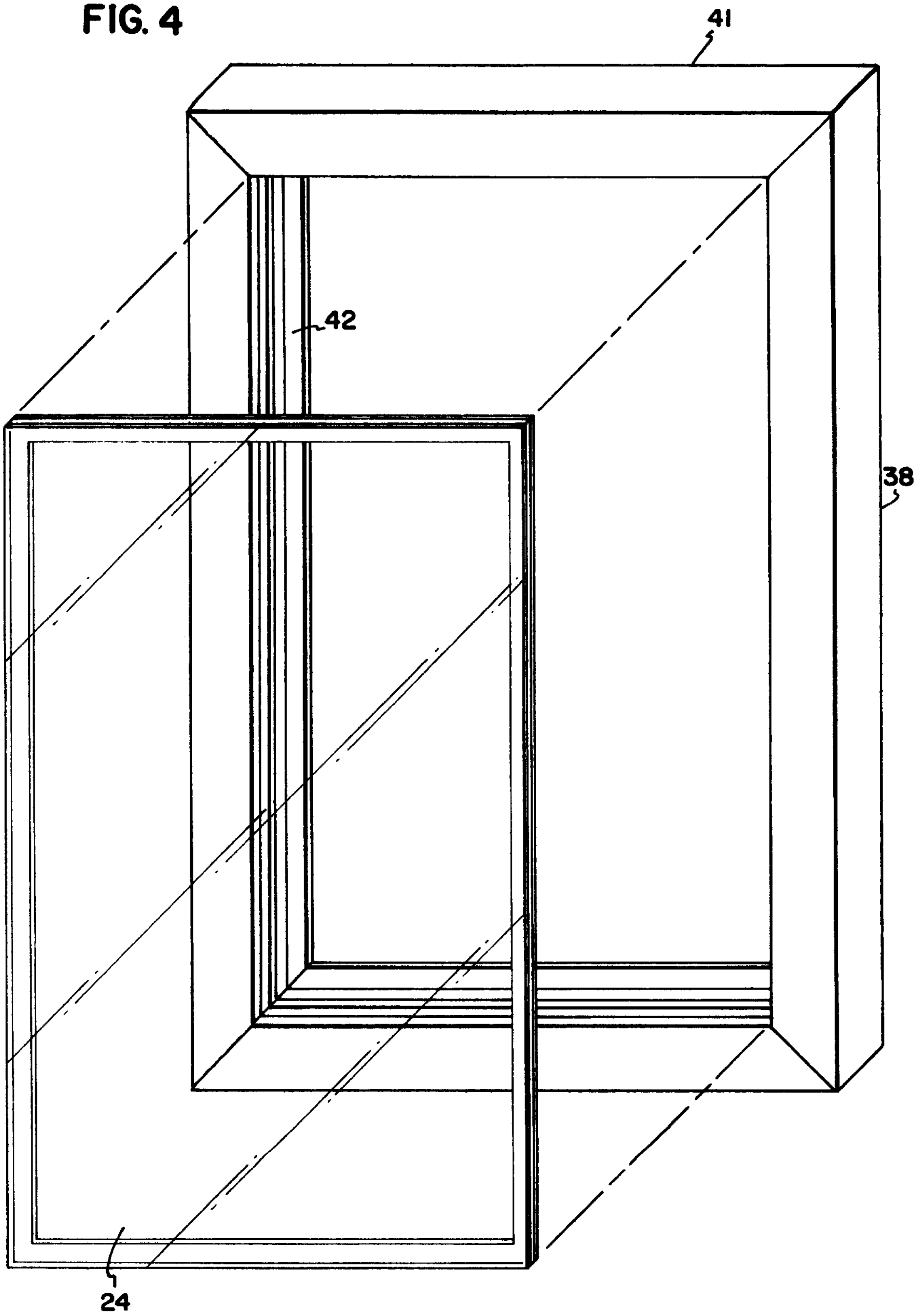
FIG. 4 is a perspective view of the window shape of FIG. 3, ready to receive a panel of glazing of the present invention.

The glazing panel 24 may be installed in the sash 22 by a variety of methods known in the art, including bed glaze construction or groove glaze construction. As shown in FIG. 4, a panel of glazing panel 24 is preferably installed by placing it on a ledge 42 that is a part of the sash portion 36 of the lineal members 30. The ledge 42 is also illustrated in FIG. 6. Preferably, an adhesive and/or sealant is applied to the ledge 42 before the glazing panel 24 is dropped into place. This type of construction is commonly referred to as bed glaze construction.

Then a trim strip, such as a glazing bead or a cladding profile, may be added to the edge of the glazing panel 24, opposite the ledge 42, as is known in the art. A glazing bead is typically applied in separate lengths around the perimeter of the glazing. A cladding can be either applied one length at a time, or can be formed into a rectangle and snapped into place over the glazing.

An alternative method of installing the panel of glazing is to assemble the window outline 41 around the panel of glazing 24. Although this method is not illustrated, it will be understood by those of skill in the art that the individual lengths 38 may be joined to form the window shape 41, as shown in FIG. 2, around the panel of glazing, where an adhesive or sealant is placed on the area of the individual lengths 38 that will be in contact with the panel of glazing. This type of construction is commonly referred to as groove glaze construction. In groove glaze construction, the sash portion may differ from the sash portion illustrated in FIG. 6 because the sash portion may include a groove for holding the glazing panel.

During groove glaze construction adhesive may be pushed aside by the edge of the glazing panel 24 as the individual lengths 38 are assembled to form the window shape 4 1, resulting in a less reliable seal between the glazing panel and the sash. As a result, bed glaze construction is the preferred method for installing a panel of glazing in the present invention.

A complete stationary window is now formed. Where a venting window is desired, the next step in the process of assembling a window according to one embodiment of the present invention is to separate the sash from the frame in the window 18. As shown in FIG. 5, the material joining the sash portion 36 to the frame portion 34 is cut, using routers 43 for example. In FIG. 6, two webs of material 44 and 45 that join the frame portion 34 and the sash portion 36 are illustrated near routers 43. After the webs of material 44 and 45 are cut, the frame portion and the sash portion are separate components. Now, hinges, locks, openers, and other hardware components can be installed to the sash or frame or to the intersection between the sash and the frame in order to create an operating window, as shown in FIG. 1.

According to the present invention, the two production processes for forming the frame and sash components are replaced by one production process for forming the lineal member 30. Using the preferred embodiment, two separate assembly processes for forming the frame 20 and sash 22 from individual lengths are replaced by one assembly process. Because the frame 20 and sash 22 are assembled while the sash portion 36 and frame portion 34 are still joined together in the lineal member, a proper fit between the frame 20 and sash 22 is more likely than if the sash and frame were separately assembled. As a result, manufacturing efficiency and accuracy are improved.

Where a stationary window is desired rather than a venting window 18, the connection between the sash and the frame remains intact. A stationary window made by this procedure has the advantage of having an intact physical connection between the sash and the frame to improve the weathertightness and sturdiness of the stationary window. In some current methods for producing stationary windows, separate sash and frame components are extruded and formed into a sash and a frame, respectively, and then the sash and frame are fastened together with clips or otherwise joined together to form a stationary window. However, by forming a stationary window according to the present invention, there is no need for clips or for an additional joining step. In addition, a stationary window can be formed using many of the same assembly steps that are used to form a venting window, so that similar production equipment and a nearly identical assembly line may be utilized for forming stationary windows according to the present invention.

In a less preferred second alternative embodiment of the present invention, the lineal member 30 is divided into the sash members 26 and frame members 25 before the members are joined to form the sash 22 and frame 20, respectively. Now referring to FIG. 2, the frame member 25 and the sash member 26 may be separated from each other before the rectangles of the frame and sash that will form the window are joined together at the corners. The frame member 25 and the sash member 26 may or may not be separated from each other before the mitered corners are applied. Then, a completely formed sash and a completely formed separate frame would result, rather than the combined sash and frame formed in FIG. 3. The next step would be installing a panel of glazing, similar to the step shown in FIG. 4, except that the panel glazing would be installed in the sash alone. The step of separating the sash and frame shown in FIG. 5 for the preferred embodiment would not be necessary in this alternative embodiment, because the sash and frame would already be separated. This alternative embodiment would not take advantage of many of the assembly efficiencies of the preferred embodiment, but would eliminate the need for two separately extruded sash and frame profiles.

Now referring to FIG. 6, one embodiment of the profile 30 of the lineal member 38 will be discussed in greater detail. The sash portion 36 will be separated from the frame portion 34 by cutting two webs of material 44 and 45. Each of the webs 44 and 45 may instead include two or more webs, so that a total of four or more webs would be cut to separate the sash from the frame. Many other connecting web configurations are possible, and some additional examples will be discussed herein. The sash portion 36 includes a ledge 42 for supporting the glazing panel 24. FIG. 6 also illustrates an interior stop or glazing bead 46 that is attached using a screw to the sash portion 36. The glazing bead provides a finished trim to the edge of one side of the glazing opposite from the ledge 42. More commonly, a glazing bead is attached to the sash using a snap-fit or friction-fit configuration, rather than a visible screw. Any of these attachment techniques, and other techniques that are known in the art, may be used in connection with the present invention.

A spacing device 47 is also illustrated in FIG. 6 between two pieces of glass that form the insulated glazing panel 24. The profile 30 also includes a platform 53 for attachment of an operator to open and close the window, as will be discussed in more detail below. A weather stripping groove 54 may be provided in the frame portion 34 to allow attachment of a weather stripping bulb.

FIG. 7 shows a cross-sectional view of the lineal member 30, with the sash portion 36 and the frame portion 34 separated and hardware installed. An operator 48 is attached to the platform 53 of the frame portion 34, including an operator arm 49 that is attached to a surface of the sash portion 36, and a handle 50. A hinge 52 is connected to both the sash portion 36 and the frame portion 34. In addition, a weather stripping bulb 51 is situated in between the sash portion and the frame portion to provide for a weather tight seal between the sash and the frame, held in the weather stripping groove 54.

Figure 8:
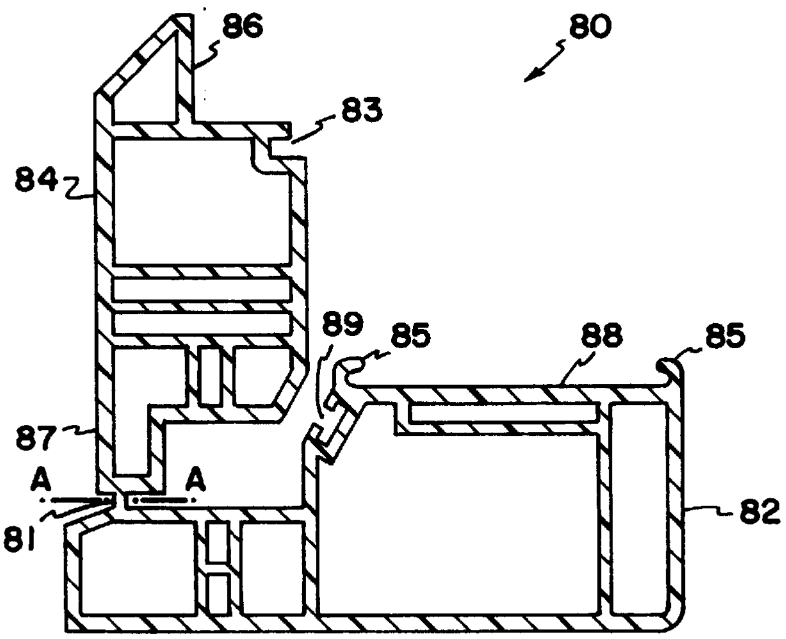
FIG. 8 is a cross-sectional view of a second embodiment of a lineal member of the present invention.
Figure 9:
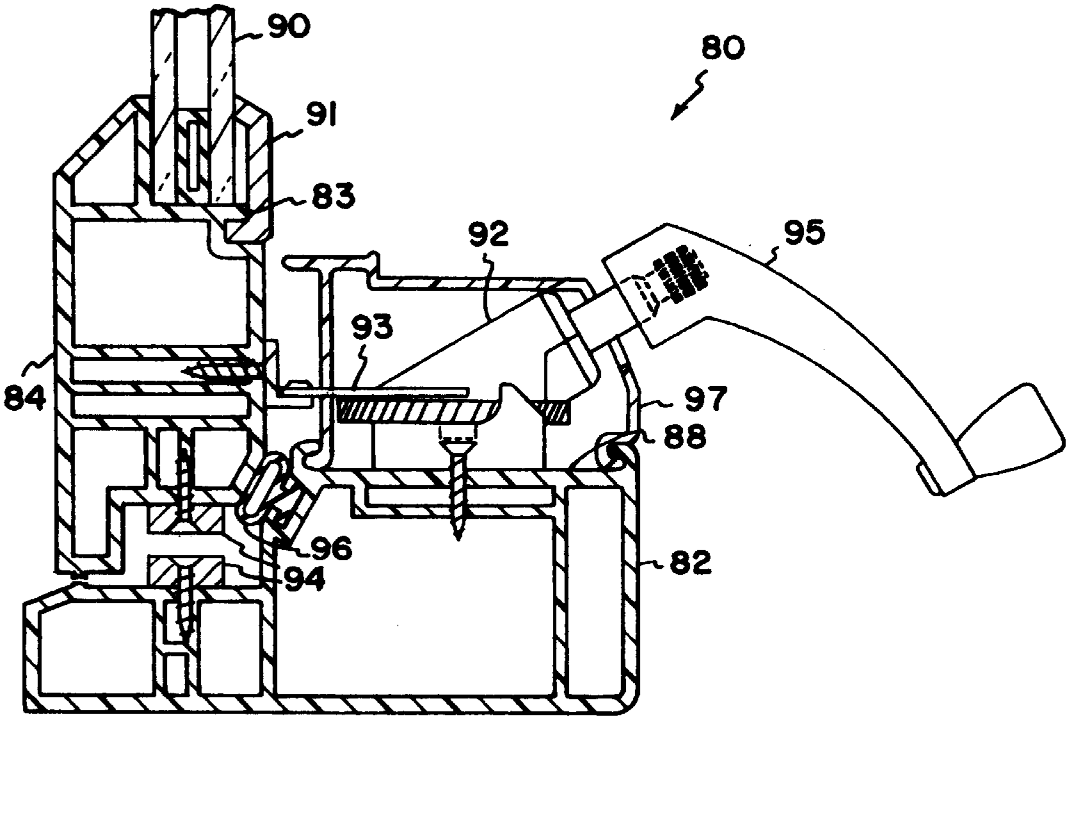
FIG. 9 is a cross-sectional view of the lineal member of FIG. 8, shown after the sash and frame portions have been separated, a panel of glazing has been installed, and hardware has been attached.

FIGS. 8 and 9 illustrate an alternative design of a lineal member profile 80 of the present invention. The lineal member profile 80 includes a frame portion 82 and a sash portion 84. In this embodiment of the lineal member 80, one web of material 81 connects the frame portion 82 to the sash portion 84. The profile 80 also includes a ledge 86 for supporting a panel of glazing. A platform 88 is included in the frame portion 82 for attachment of an operator for opening and closing the window. The profile also includes an exterior surface 87 that will face the exterior of the structure when the window is installed in a structure. In addition, a groove 89 for supporting a weather stripping bulb and a groove 83 for attaching a glazing bead are shown in FIG. 8. The profile 80 also includes two cover attachment portions 85 that may be used to attach a cover to the frame portion 82.

In FIG. 9, the profile 80 is shown in cross-section in an assembled position. A panel of glazing 90 has been installed on the ledge 86. A glazing bead 91 is also included, fitting into the groove 83. An operator 92 is attached to the platform 88 of the frame portion 82, including an operator arm 93 attached to the sash portion 84 and a handle 95. A hinge 94 is also included. A weather stripping bulb 96 is provided between the sash portion 84 and the frame portion 82 to improve the weathertightness of the window. A cover 97 is shown in place over a portion of the operator 92, attached to the cover attachment portions on the frame portion 82. The use of a cover 97 may provide the consumer with distinct aesthetic features on the interior frame portion, and may hide the operator mechanisms, providing for a more attractive interior appearance. Preferably, the cover 97 is formed in a separate process from the rest of the profile 80. The embodiment shown in FIGS. 8 and 9 has the advantage of only one connecting web of material, and provides interior cover options.

Figure 10:
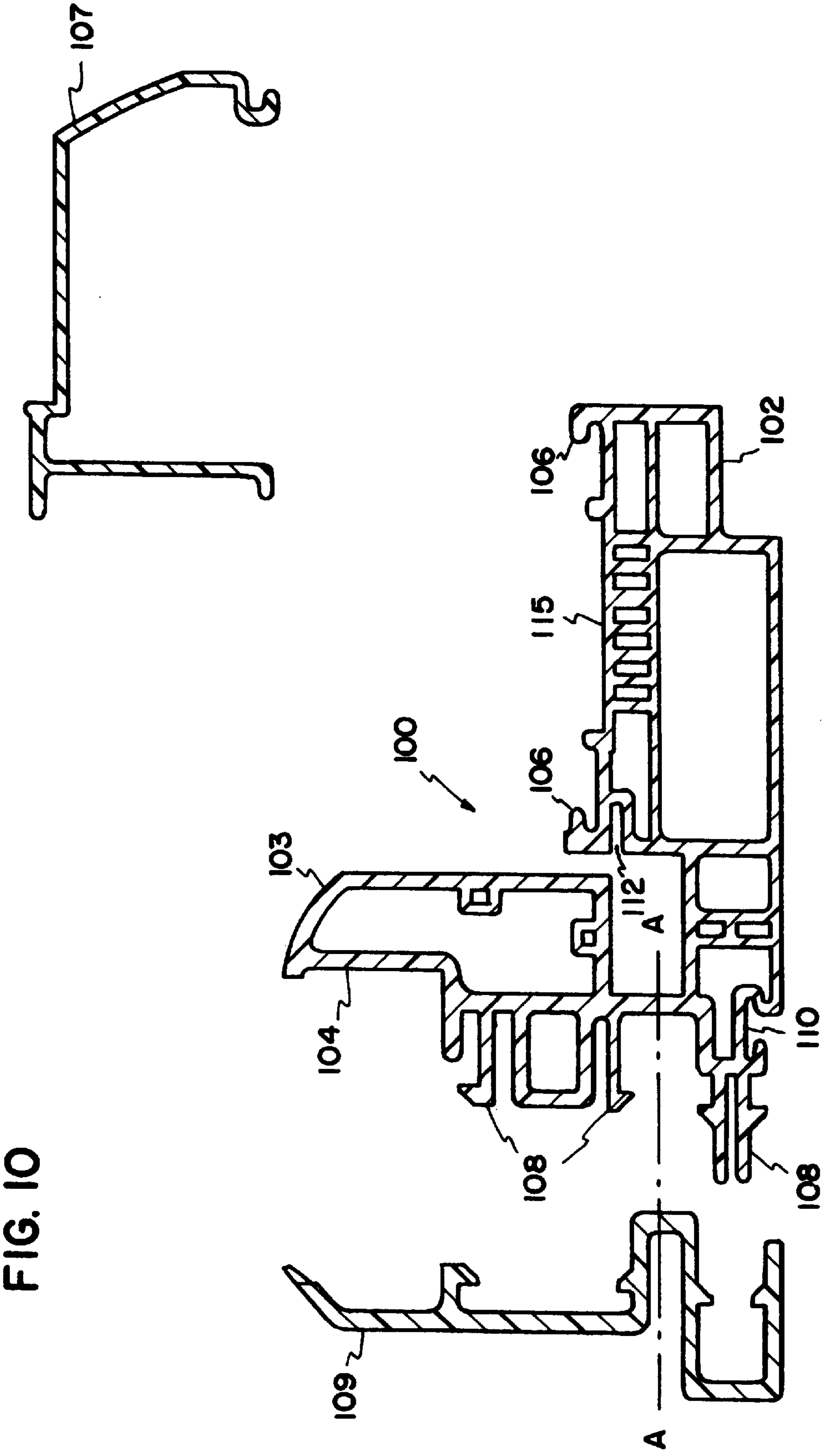
FIG. 10 is a cross-sectional view of a third embodiment of a lineal member shown with a cover portion and an exterior trim strip to be attached.
Figure 11:
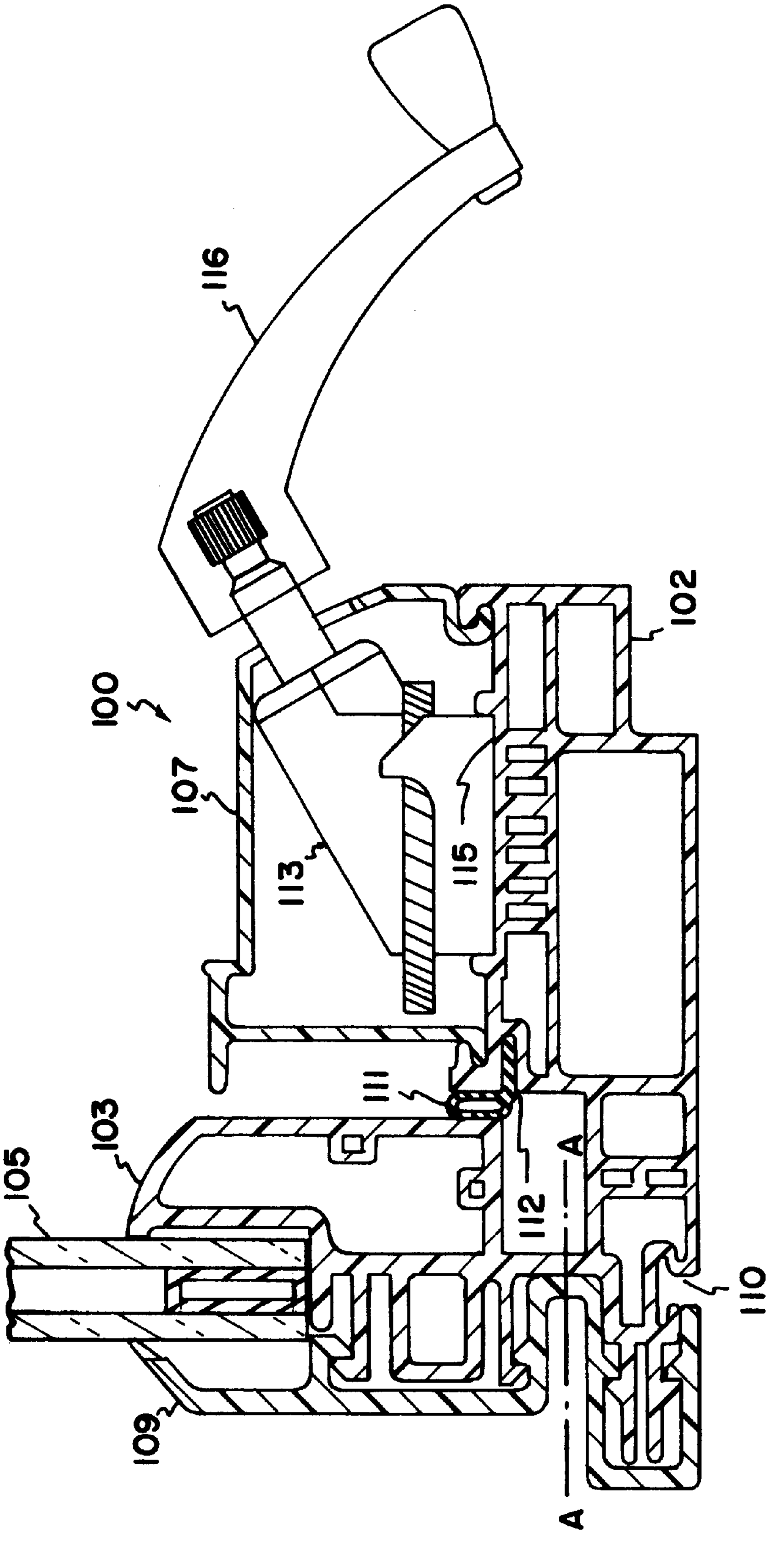
FIG. 11 is a cross-sectional view of the lineal member of FIG. 10 where a panel of glazing and hardware have been installed and the cover portion and exterior trim portion have been added, also showing the line A—A where the sash portion and frame portion will be separated.

Now referring to FIGS. 10 and 11, a third embodiment of a profile 100 of the present invention is illustrated in an unassembled state in FIG. 10 and in an assembled state in FIG. 11. The profile 100 includes a frame portion 102 and a sash portion 103 that are connected by one web of material. A cut along line A—A will separate the sash portion from the frame portion. The profile 100 includes a ledge 104 to support a glazing panel 105. The frame portion 102 includes cover attachment portions 106 for attaching to a cover 107. The sash portion 103 includes cladding attachment portions 108 for attaching to a cladding 109. The cover 107 fits over the interior portion of the frame portion 102, may provide a different aesthetic appearance to the interior of the window and may also disguise hardware such as an operator for opening and closing the window. The cladding 109 fits onto the exterior portion of the sash portion and the frame portion to provide an aesthetic appearance to the exterior of the window. In addition, the cladding portion may provide a finished trim to one side of the glazing panel 105. The cladding 109 and cover 107 will preferably be made in separate production processes from the rest of the profile 100, and may therefore be provided with color for design purposes.

One advantage of the cover attachment and cladding attachment options illustrated in FIGS. 10–11 is that an underlying window chassis can be mass produced, but color and design variations can be made by attaching cover and cladding portions having different design features, shapes, and colors. Windows with many different colors and shapes can be produced using largely the same assembly line and largely the same inventory of components, since only the cladding and/or cover portions need to be varied.

The frame portion 102 further includes a T-groove 10 that can be attached to a nailing flange for attaching the frame to a building. A weather stripping portion 111 may be provided between the sash and the frame and may fit into a weather stripping groove 112 on the frame portion 102. An operator 113 may also be installed on a platform 115 of the frame portion 102, including a handle 116. Although an operator bar is not illustrated in FIG. 1, such an operator bar may be provided with the embodiment of FIGS. 10 and 11 in a manner similar to that illustrated in FIG. 9, making a connection between the operator 113 and the sash portion 103. Likewise, although a hinge is not illustrated in FIG. 11, a hinge could be provided similar to the hinge illustrated in FIG. 9.

Figure 12:
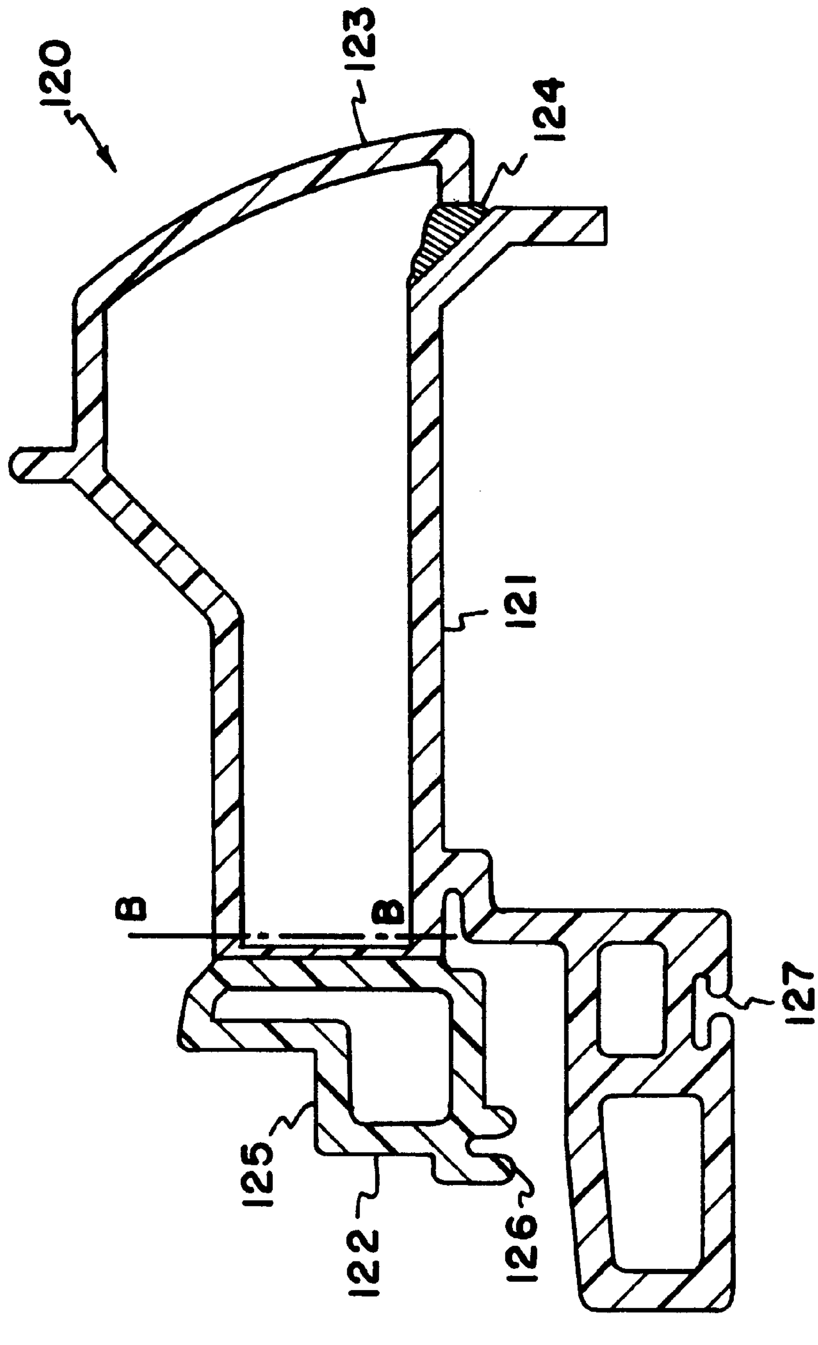
FIG. 12 is a cross-sectional view of a fourth embodiment of a lineal member of the present invention where the lineal member also includes a hinged cover portion, and where the line B—B indicates the separation line between the sash and frame.

An alternative embodiment lineal member 120 of the invention is shown in FIG. 12. This lineal member 120 includes a frame portion 121, a sash portion 122, and a cover portion 123. A cover portion 123 can be included on the interior surface of a window frame of the present invention, and can hide hardware such as an operator for opening the window or provide a unique aesthetic appearance, but is not required. The cover 123 may include a hinge portion 124, made of a more flexible material than the remainder of the cover 123. The hinge portion 124 allows the cover 123 to be bent back to expose the frame portion underneath, after the cover 123 has been separated from the frame at the non-hinging edge of the cover. A cut along line B—B in FIG. 12 may be used to separate the non-hinging side of the cover 123 from the frame 121. This arrangement allows hardware components to be installed on the frame member and then be concealed under the cover 123, after the window is assembled. After a sash and frame of a window is assembled, hardware such as an operator, window locks, and other devices are typically installed. Then the cover is bent back into place and secured using methods known in the art so that the cover is covering the hardware. If the cover 123 is not provided with a hinge area, the cover can be removed with a cut to allow hardware installation and then be reattached using methods known in the art.

Preferably, the lineal member 120 of FIG. 12 is made of a vinyl material formed by extrusion while the hinge portion 124 is a softer, plasticized vinyl that is co-extruded with the remainder of the lineal member 120, as is known in the art. The sash portion 122 shown in FIG. 12 includes a ledge 125 for supporting a glazing panel. The sash portion 122 may also include an attachment device 126 for receiving a cladding portion. The frame portion 121 may include a groove 127 for receiving a T-shaped nailing or stapling flange that can be secured to the structure or wall into which the window is being installed. The lineal member 120 can be assembled into a window using the methods discussed above. The lineal member 120 is cut near line B—B to separate the frame portion 121 from the sash portion 122. In this embodiment, two webs of material are cut to separate the frame from the sash, and to separate the cover from the sash along line B—B.

The lineal profiles shown in FIGS. 6–12 incorporate different features, such as T-shaped grooves for receiving nailing flanges, attachment points for cladding profiles, and glazing beads of different configurations. Those of skill in the art will understand that many of these various features, although they may be illustrated on only one of the Figures, may be included in any of the lineal profile designs that were discussed. For example, a T-shaped groove for receiving a nailing flange could be provided on the profile 30 shown in FIGS. 6 and 7 or on the profile 80 shown in FIGS. 8 and 9, although it is not illustrated in those drawings.

Details of producing a lineal member of the present invention will now be discussed. The lineal member may be produced using a variety of methods that are known in the art. The most preferred method is extrusion using vinyl, such as polyvinyl chloride (PVC), or a wood polymer composite. The lineal members of the invention could be formed with a color layer on exterior surfaces of the lineal member by co-extrusion with a colored material. However, injection molding methods, roll-formed metal methods, wood milling methods and other methods may also be used, where a length of the profile may be formed with a consistent cross-section. Where injection molding is used, materials such as ABS (Acrylonitrile Butadiene Styrene), polyethylene, polycarbonate, polypropylene or another polymer could be used. For injection molding, the sash and frame portions could be initially joined by points of connection, a continuous connection web, or an intermittent connection pattern. The lineal member could also be made of metal, aluminum, wood, and a variety of other materials that can be used to form a length of a profile with a consistent cross-section that is capable of being separated into a sash profile and a frame profile. For example, the lineal member could be formed by roll-forming metal, by pultrusion of fiberglass, or by wood milling.

Although many materials can be used with the present invention, the use of vinyl or a wood and polymer composite in an extrusion process is probably the most feasible and practical method of practicing the invention. A preferred wood and polymer composite material is described in U.S. Pat. No. 5,406,768, which is incorporated herein by reference in its entirety. Durability, insulation qualities, and cost are important factors to consider when choosing a material for a window. Extrusion design tolerances should also be considered when choosing a material and when designing a profile configuration. Design tolerances can vary widely depending on the dimensions of the profile, the material used, and many other factors.

If a cover is included, the cover may be constructed of a variety of materials and by a variety of methods that are known in the art. Preferably, vinyl is extruded to form the cover. Cladding can be manufactured using many materials that are known in the art. One preferred material for cladding is a wood polymer composite, for example as described in U.S. Pat. No. 5,406,768, or vinyl, among other possible materials that are known in the art. A wood and polymer composite is preferred for an exterior cladding material, such as for exterior cladding 46, because it is more resistant to temperature extremes and can be offered in a wider variety of colors, especially dark colors.

In another embodiment of the invention, a cladding profile may be included in the profile of the lineal member. The cladding may be removed before the glazing panel is installed. Alternatively, a groove glaze construction can be used.

The cuts made in the unitary profiles discussed above may be performed by many different types of tools that are known in the art. Preferably, a router is used.

The various embodiments described above are provided by way of illustration only and should not be construed to limit the invention. Those skilled in the art will readily recognize various modifications and changes which may be made to the present invention without strictly following the exemplary embodiments and applications illustrated and described herein, and without from the true spirit and scope of the present invention, which is set forth in the following claims.

We claim:

1. A method for assembling a window, comprising:

forming a lineal member having a cross-sectional profile, the profile including a sash portion and a frame portion;

cutting the lineal member into lengths sized for forming the window;

joining the lengths of the lineal member to form a shape of the window, wherein the sash portions form a sash and the frame portions form a frame; and separating the sash from the frame.

2. The method of claim 1 wherein the step of cutting the lineal member into lengths comprises separating the lineal member into at least four lengths and forming mitered corners on ends of the lengths, and the step of joining the lengths comprises forming the lengths into a rectangle.

3. The method of claim 1 further comprising the step of installing a glazing panel into the sash after joining the lengths of the lineal member to form a shape of the window.

4. The method of claim 3 further comprising the step of installing a trim strip over edges of the glazing panel.

5. The method of claim 4 wherein the trim strip is selected from the group consisting of a glazing bead or a cladding.

6. The method of claim 1 wherein the lengths of the lineal member are joined around a glazing panel.

7. The method of claim 1 wherein the sash portion and the frame portion are connected in the profile by two or more webs of material and the step of separating the sash and the frame comprises cutting the two or more webs of material.

8. The method of claim 1 wherein the frame portion and sash portion are connected in the profile by one web of material and the step of separating the frame and sash comprises cutting the web of material.

9. The method of claim 1 further comprising installing hardware onto the frame and the sash.

10. The method of claim 9 wherein the hardware is selected from a group consisting of a latch, an operator, and a hinge.

11. The method of claim 1 wherein the lineal member is formed by extrusion.

12. The method of claim 11 wherein the lineal member comprises vinyl material.

13. The method of claim 11 wherein the lineal member comprises a composite of wood and polymer material.

14. The lineal member of claim 11 wherein the lineal member comprises aluminum.

15. The method of claim 1 wherein the lineal member is formed by injection molding.

16. The method of claim 15 wherein the lineal member comprises a material selected from the group of ABS, polyethylene, polycarbonate, polypropylene and other polymers.

17. The method of claim 1 wherein the lineal member is formed by pultrusion.

18. The method of claim 17 wherein the lineal member comprises fiberglass.

19. The method of claim 1 wherein the lineal member is formed by roll forming metal.

20. The method of claim 1 wherein the lineal member further comprises a color layer on at least one surface of the lineal member.

21. The method of claim 1 wherein the sash portion of the profile of the lineal member further comprises a trim attachment portion for attaching to a trim strip.

22. The method of claim 1 wherein the profile of the lineal member further comprises a weather stripping portion.

23. The method of claim 1 wherein forming the lineal member includes forming the frame portion of the lineal member to include a platform for attaching an actuator and forming the sash portion to include an extension portion that extends over the platform of the frame portion, wherein when the sash and frame are in a closed position, the extension portion at least partially conceals the actuator.

24. The method of claim 1 further comprising attaching a cover to cover attachment portions on the frame portion to at least partially enclose hardware on the frame.

25. The method of claim 1 wherein the profile further includes a cover portion adjacent to the frame portion, further comprising:

bending the cover portion away from the frame portion at a hinge portion, installing hardware on the frame portion, and securing the cover portion to the frame portion.

26. The method of claim 25 further comprising separating a non-hinging edge of the cover portion from the frame portion.

27. The method of claim 1 wherein the profile further includes a cover portion adjacent to the frame portion, further comprising:

separating the cover portion from the frame portion, installing hardware on the frame portion, and attaching the cover portion to the frame portion.

28. The method of claim 27 wherein the steps of separating the cover portion, installing hardware and attaching the cover portion are performed after the lengths of the lineal member are joined to form the shape of the window.

29. A method for assembling a window, comprising:

forming a lineal member having a cross-sectional profile, the profile including a sash portion and a frame portion;

separating the sash portion from the frame portion;

cutting the sash portion and frame portion into lengths sized for forming the window; and joining the lengths to form a shape of the window, wherein the sash portions form a sash and the frame portions form a frame.

30. A method for manufacturing venting and non-venting windows comprising:

forming a lineal member having a cross-sectional profile, the profile including a sash portion and a frame portion;

cutting the lineal member into lengths sized for forming a window;

joining at least four of the lengths of the lineal member to form a shape of a window, wherein the sash portions form a sash and the frame portions form a frame;

separating the sash from the frame to form a venting window; and allowing the sash and frame to remain connected to form a non-venting window;

whereby a single production operation is used to form both venting windows and non-venting windows until a final step of separating the sash from the frame for venting windows.

31. The method of claim 30 wherein the lineal member is formed by extrusion.

32. The method of claim 31 wherein the lineal member is formed of a material selected from the group consisting of vinyl and a wood and polymer composite.

33. The method of claim 30 wherein the sash portion and frame portion are connected in the profile by two or more webs of material and the step of separating the sash and frame comprises cutting the two or more webs of material.

34. The method of claim 30 wherein the sash portion and frame portion are connected in the profile by one web of material and the step of separating the sash and frame comprises cutting the one web of material.

* * * * *